US012005723B2

(12) United States Patent
Brisseau et al.

(10) Patent No.: US 12,005,723 B2
(45) Date of Patent: Jun. 11, 2024

(54) REMOVABLE DEVICE FOR THE INSTALLATION OF AN ENDLESS RIBBON

(71) Applicant: ARMOR, Nantes (FR)

(72) Inventors: Vincent Brisseau, Trémentines (FR); Maxime Charrier, Trémentines (FR); Antoine Lefort, Cholet (FR)

(73) Assignee: ARMOR, Nantes (FR)

(*) Notice: Subject to any disclaimer, the term of this patent is extended or adjusted under 35 U.S.C. 154(b) by 0 days.

(21) Appl. No.: 18/263,266

(22) PCT Filed: Jan. 28, 2022

(86) PCT No.: PCT/EP2022/052137

§ 371 (c)(1),
(2) Date: Aug. 4, 2023

(87) PCT Pub. No.: WO2022/162195

PCT Pub. Date: Aug. 4, 2022

(65) Prior Publication Data

US 2024/0034082 A1 Feb. 1, 2024

(30) Foreign Application Priority Data

Jan. 29, 2021 (EP) .................................... 21315013

(51) Int. Cl.

| | |
|---|---|
| ***B41J 32/02*** | (2006.01) |
| ***B41J 33/10*** | (2006.01) |
| ***B41J 35/28*** | (2006.01) |

(52) U.S. Cl.

CPC ............... *B41J 32/02* (2013.01); *B41J 33/10* (2013.01); *B41J 35/28* (2013.01)

(58) Field of Classification Search

None

See application file for complete search history.

(56) References Cited

U.S. PATENT DOCUMENTS

| | | | | |
|---|---|---|---|---|
| 2017/0136795 | A1* | 5/2017 | Paulson | B41J 32/00 |
| 2020/0047488 | A1 | 2/2020 | Yamane et al. | |

FOREIGN PATENT DOCUMENTS

| | | | | |
|---|---|---|---|---|
| CN | 104175729 A | 12/2014 | | |
| CN | 203995148 U | 12/2014 | | |
| CN | 109435503 A | 3/2019 | | |
| CN | 209920746 U | 1/2020 | | |
| CN | 111791616 A | 10/2020 | | |
| DE | 10 2008 032804 B4 | 7/2018 | | |
| EP | 3498475 A1 | * | 6/2019 | B41F 31/027 |

(Continued)

OTHER PUBLICATIONS

International Search Report as issued in International Patent Application No. PCT/EP2022/052137, dated May 20, 2022.

(Continued)

*Primary Examiner* — Leslie J Evanisko

(74) *Attorney, Agent, or Firm* — Pillsbury Winthrop Shaw Pittman LLP

(57) ABSTRACT

A removable device adapted to cooperate with a conveyor system for the installation of an endless ribbon in the conveyor system, the removable device includes at least two support elements to support the endless ribbon, each support element being movable in rotation around a rotation axis and each support element having a convex portion to support a portion of the endless ribbon.

17 Claims, 8 Drawing Sheets

(56) References Cited

FOREIGN PATENT DOCUMENTS

| | | | |
|---|---|---|---|
| EP | 3 055 135 | B1 | 7/2019 |
| GB | 622088 | A | 4/1949 |
| GB | 1352422 | A | 5/1974 |

OTHER PUBLICATIONS

Written Opinion of the International Searching Authority as issued in International Patent Application No. PCT/EP2022/052137, dated May 20, 2022.

HR First Office Action as issued in Chinese Patent Application No. 202280022786.X, dated Mar. 9, 2024.

* cited by examiner

REMOVABLE DEVICE FOR THE INSTALLATION OF AN ENDLESS RIBBON

CROSS-REFERENCE TO RELATED APPLICATIONS

This application is the U.S. National Stage of PCT/EP2022/052137, filed Jan. 28, 2022, which in turn claims priority to European patent application number 21315013.9 filed Jan. 29, 2021. The content of these applications are incorporated herein by reference in their entireties.

FIELD

The present disclosure relates to the technical field of installation devices, and more particularly to a removable device for the installation of a ribbon in a conveyor system, preferably of an endless ribbon in a thermal transfer printing apparatus.

BACKGROUND

Current solutions involving a thermal transfer printing apparatus use a disposable already coated ribbon. One limitation of these solutions is that the ribbon needs to be replaced periodically as the end of the ribbon has been reached.

To cope with the disposal of such used ribbon along with the remaining un-transferred ink, in an alternative class of thermal transfer printing apparatus, an endless ribbon is continuously coated and exposed to the thermal head while recovering the non-printed ink.

Such solutions offer reusing the remaining portion of the ink that is not used in previous thermal transfer printing cycles and reduce the wastes produced from the disposable ribbon of the printing apparatus.

In an emerging class of thermal transfer printing apparatus, an endless ribbon is transported while a part of the ribbon is exposed to the thermal printhead. It is an objective to use a ribbon capable of withstanding a large number of cycles, for example multiple million cycles through the system. This imposes, among other steps, coating new ink continuously on the ribbon to ensure a homogenous layer of ink on the ribbon while printing.

One limitation is that the ribbon still must be replaced after several cycles when the ribbon reaches the end of its lifetime. However, a manual replacement of a ribbon in a conveyor system implies several limitations. Firstly, a manual insertion of the ribbon is impossible without taking a lot of precautions not to damage it. Indeed, a conveyor system can comprise a lot of rollers and the ribbons used in such conveyors systems are usually thin and unstable. It is then not possible to guarantee a good repeatability in the replacing of the ribbon without taking the risk of damaging it. Secondly, such replacement takes a long time. Indeed, the path of the ribbon is more complex. This solution disadvantageously implies to stop the production line for a long time to replace the ribbon.

SUMMARY

It is one objective of the present invention to overcome the precited inconveniences by providing a way of replacing an endless ribbon in a conveyor system, preferably in a thermal transfer printing apparatus. This aim is reached by providing a removable device for the installation of an endless ribbon in a conveyor system, preferably a thermal transfer printing apparatus.

According to a first aspect, the invention relates to a removable to device adapted to cooperate with a conveyor system for the installation of an endless ribbon in said conveyor system. The removable device comprises at least two support elements to support the endless ribbon, each support element being movable in rotation around a rotation axis and each support element having a convex portion to support a portion of the endless ribbon.

In one embodiment, the removable device comprises at least two support elements to support an endless ribbon and each support element are movable in rotation around a rotation axis. Each support element comprises: a convex portion to support a portion of the endless ribbon, and an arm having a distal end mechanically connected to the convex portion and a proximal end mechanically connected to the frame by a pivot connection allowing the rotation of the support element around the rotation axis.

The invention advantageously allows inserting an endless ribbon supported by the supports element along a path in the conveyor system. The rotation of the support elements advantageously allows withdrawing such support element from the path of the ribbon and allows the ribbon to stay in the conveyor system. Therefore, no manual handling of the endless ribbon is needed, the installation can be done very quickly and the risk of damaging the ribbon is reduced. The removable device may be used for both the removal and the installation of the ribbon.

In one embodiment, the removable device further comprises cooperation elements for engaging each support element into the conveyor system.

Advantageously, the cooperation elements allow the positioning of the removable device into the conveyor system. Therefore, it reduces the risk of damaging any part of the conveyor system or of the removable device during the ribbon installation. The removable device can advantageously stay engaged over the conveyor system after the ribbon installation.

In one embodiment, the removable device further comprises a frame and each support element is connected to the frame with at least one degree of freedom.

Advantageously, the connection to the frame allows each support element to be moved when the removable device is engaged over the conveyor system. It also allows both the installation of the ribbon on the roller of the conveyor system and the removal of the ribbon from the rollers of the to conveyor system.

In one embodiment, each support element of the removable device is free to rotate at least 90°, preferably 180°, around the rotation axis. It advantageously allows the support element to rotate around the roller.

Each support element can advantageously rotate when the removable device is engaged over the conveyor system. Therefore, the installation of the ribbon in the conveyor system is eased.

In one embodiment, at least one support element of the removable device has a second degree of freedom, preferably in translation or in rotation.

Therefore, it advantageously allows applying the tension in the endless ribbon depending on the positioning of said at least one support element.

In one embodiment, each support element of the removable device is movable between at least two positions, the first position of each support element allowing maintaining the endless ribbon on their respective convex portion with a first predefined tension, the second position maintaining the endless ribbon with a tension inferior to the first predefined tension.

The first position advantageously allows installing the removable device without damaging the ribbon. The first position also allows stretching the ribbon in such a way that the ribbon is not in contact with rollers in the conveyor system. The second position advantageously allows reducing the tension in the ribbon until the ribbon reaches the ribbon path in the conveyor system.

In one embodiment, the removable device is adapted to be removed from the conveyor system when each support element is in the first or in the second position. It advantageously allows separating the removable device from the conveyor system after the installation of the endless ribbon in the conveyor system.

In one embodiment, each support element of the removable device is in its second position when each support element is withdrawn from a predefined ribbon path, preferably predefined by the support element arrangement in the first position. It advantageously improves the installation of the ribbon. Furthermore, each support element being withdrawn from a predefined ribbon path advantageously prevents damaging the ribbon in the conveyor system while the ribbon is transported by said conveyor system.

In one embodiment, the shape of at least one support element of the removable device comprises at least a portion of a hollow cylinder. The hollow cylinder portion advantageously supports the endless ribbon without need of an excess of ribbon that would be required with a different shape. It also advantageously makes the removable device more compact.

In one embodiment, at least one support element of the removable device comprises a roller. It advantageously reduces the friction between the ribbon and the support element when the support element is rotating around the rotation axis.

In one embodiment, at least one support element of the removable device is adapted to move along a path around another element, the path defining a revolution trajectory around said element. Advantageously, it allows easier positioning of the endless ribbon in the conveyor system.

In one embodiment, the removable device is designed to be engaged along at least two rollers of the conveyor system, each support element being movable between the first and the second position around one roller of the conveyor system when the removable device is engaged over the conveyor system. In the first position, each support element may be arranged to cover the first circumferential portion of one roller of the conveyor system and/or in the second position, each support element may allow free passage of the endless ribbon along the first circumferential portion.

Each support element of the removable device being movable around one roller of the conveyor system advantageously improves the installation of the endless ribbon on the rollers of the conveyor system. Indeed, each support element can be advantageously placed on the external portion of each roller of the conveyor system when each support element is in the first position and when each support element is still supporting the endless ribbon. Then, each support element can be moved in rotation around the rollers of the conveyor system to leave the ribbon on the roller of the conveyor system. Advantageously, when each support element of the removable device is in its second position, the endless ribbon is free to be transported along a path defined by each roller of the conveyor system without interference with the rollers of the removable device.

In one embodiment, the rotation axis of one support element of the removable device is parallel to the rotation axis of one roller of the conveyor to system. It advantageously improves the positioning of the endless ribbon when each support element is switching between the first position and the second position.

In one embodiment, at least one support element of the removable device is configured to translate along a slide. The translation of at least one support element allows advantageously to modify the tension in the ribbon according to the position along the slide of said at least one support element.

In one embodiment, the removable device comprises suspension points, preferably bearings, to support at least one extremity of a roller. The suspension points of the removable device advantageously secure the cooperation between the removable device and the conveyor system when the removable device is being engaged over the conveyor system. Moreover, in the case where the removable device stays into the conveyor system while printing, the suspension points of the removable device advantageously reinforce the conveyor system.

In one embodiment, the removable device comprises an interface configured to put each support element automatically into motion according to a predefined sequence. It advantageously reduces the risk of damaging the ribbon. It also improves the time of installation/removal.

In one embodiment, the interface of the removable device comprises control means connected to each support element; said control means being configured to put each support element into motion manually. Advantageously, in this configuration, a user can control the motion of each support element to ensure safe installation of the endless ribbon in the conveyor system.

According to a second aspect, the invention relates to a system comprising a removable device and a conveyor system. Preferably, the removable device is the removable device according to the first aspect of the invention. The conveyor system comprises at least two rollers to support an endless ribbon on a first circumferential portion of each roller and the conveyor system is adapted to cooperate with the removable device.

In one embodiment, the conveyor system is designed to transport the endless ribbon.

In one embodiment, at least one roller of the conveyor system is to arranged to move along a slide. Advantageously, the movement of at least one roller of the conveyor system along a slide allows to control the tension in the endless ribbon when the endless ribbon is installed in the conveyor system. By "installed", it should be understood that the conveyor system doesn't comprise an endless ribbon before the installation and that at least two rollers of the conveyor system support the endless ribbon after the endless ribbon has been installed.

According to a third aspect, the invention relates to a thermal transfer printing apparatus comprising a system. Preferably, the system is a system according to the second aspect of the invention.

In one embodiment, the convex portion comprises an angular length in a section according to plane perpendicular to the rotation axis less than 270°, preferably less than 180°. The angular distance a is measured in the section from the point of the axis A-A in said section according to a plane perpendicular to the rotation axis A-A.

According to another aspect, the invention relates to a removable device to insert an endless ribbon within a conveyor system of a thermal transfer printing apparatus comprising:

a frame;

at least two support elements to support an endless ribbon and each support element being movable in rotation around a rotation axis, each support element comprising:

a convex portion to support a portion of the endless ribbon; and an arm having a distal end mechanically connected to the convex portion and a proximal end mechanically connected to the frame by a pivot connection allowing the rotation of the support element around the rotation axis.

In one embodiment, each support element is free to rotate at least 90°, preferably 180°, around the rotation axis.

In one embodiment, one of the at least two support elements is connected to the frame with at least a one degree of freedom in translation.

In one embodiment, each support element is movable around the rotation axis between at least two positions, the first position of each support element allowing maintaining the endless ribbon on their respective convex to portion with a first predefined tension, the second position allowing reducing the first predefined tension.

In one embodiment, the convex portion of one support elements comprise a portion of a hollow cylinder.

In one embodiment, the convex portion of one support elements comprises a cylinder free in rotation with the distal end of the arm along the longitudinal axis of said cylinder.

According to another aspect, the invention relates to a thermal transfer printing apparatus comprising a removable device and a conveyor system comprising at least two rollers to support the endless ribbon on a first circumferential portion of each roller, wherein the conveyor system is adapted to cooperate with the removable device.

In one embodiment, the removable device comprises the endless ribbon, said endless ribbon being supported by at least two support elements of the removable device.

In one embodiment, the removable device comprises cooperation elements for engaging each support element into the conveyor system.

In one embodiment, each support element is movable around the rotation axis between at least two positions, the first position of each support element allowing maintaining the endless ribbon on their respective convex portion with a first predefined tension, the second position allowing reducing the first predefined tension and the removable device is adapted to be removed from the conveyor system when each support element is in the first or the second position.

In one embodiment, each support element is in its second position when each support element is withdrawn from a predefined ribbon path, preferably predefined by the support element arrangement in the first position.

In one embodiment, the removable device is designed to be engaged along at least two rollers of the conveyor system, each support element being movable between the first and the second position around one roller of the conveyor system when the removable device is engaged over the conveyor system:

in the first position, each support element is arranged to cover the first circumferential portion of one roller of the conveyor system;

in the second position, each support element allows free passage of the endless ribbon along the first circumferential portion.

In one embodiment, the rotation axis of one support element of the removable device is parallel to the rotation axis of one roller of the conveyor system.

In one embodiment, the removable device comprises at least two parts jointed on at least one pivot and further comprising an endless ribbon installed around the support elements of the removable device.

In one embodiment, the endless ribbon is inked.

DETAILED DESCRIPTION

The invention will be better understood with the following specification referring to the figures.

Conveyor System

Figure 1:
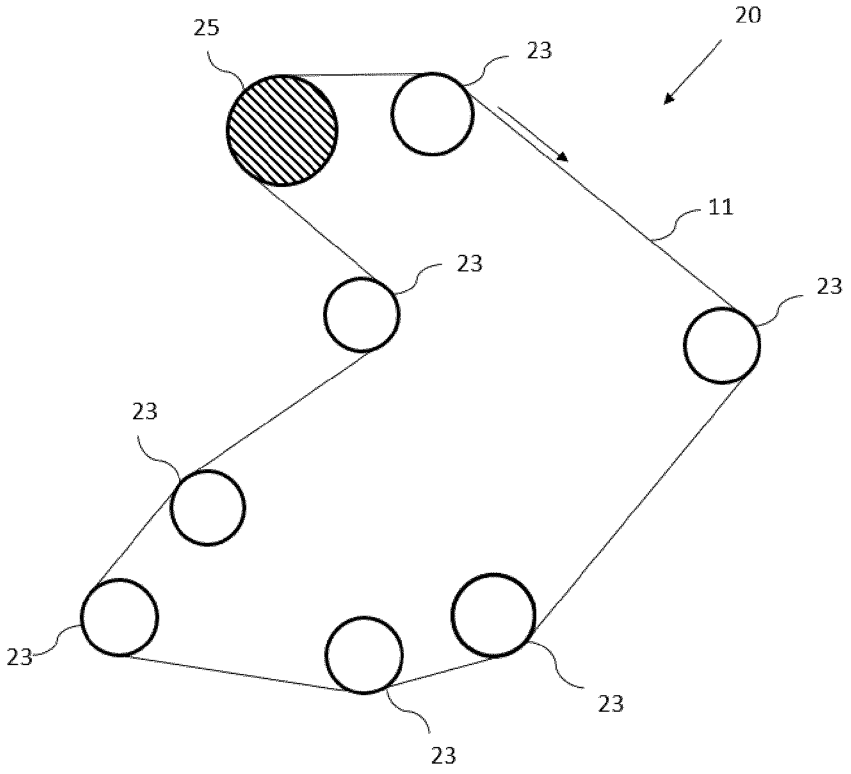
FIG. 1 is a schematic representation of a conveyor system according to one embodiment wherein it comprises a plurality of rollers and wherein each roller of the conveyor system is supporting a portion of an endless ribbon.

A preferred embodiment of a conveyor system 20 is now described in reference to FIG. 1. The conveyor system 20 comprises at least two rollers 23 to support and transport an endless ribbon 11. The path of the endless ribbon 11 follows a predefined loop. Said predefined loop depends on the arrangement of the rollers 23 inside the conveyor system 20. By "transport an endless ribbon", it should be understood that the rollers 23 are configured to to put the endless ribbon 11 into motion along the predefined looped path defined by said rollers 23.

The rollers 23 are mounted to a frame 29 of the conveyor system 20 to rotate on themselves to transport the ribbon on their circumferential surface. In one embodiment, the rollers 23 have the shape of a cylinder and are mounted to the frame 29 of the conveyor system 20 to rotate around their longitudinal axis.

At least one of the rollers 23 may be a drive roller 25. The drive roller 25 is connected to a motor to put said drive roller 25 in rotation. At least one battery may be implanted in the conveyor system 20 to provide power to supply said motor. The rotation of the drive roller 25 generates the displacement of the endless ribbon along its path which also generates the rotation of the other rollers 23.

Removable Device

A preferred embodiment, of the removable device is now described. The removable device 10 comprises a plurality of support elements 12, 14. The support elements 12, 14 are preferably connected to a frame 13. The support element 12, 14 are arranged to support an endless ribbon 11.

In one embodiment, the removable device 10 is adapted to be engaged over a conveyor system 20. In this configuration, each support element 12 is located at a specific position according to the frame 13 in order to allow the cooperation of said removable device 10 with the conveyor system 20. The specific location of each support element 10 on the frame 13 of the removable device 10 allows the cooperation between the removable device 10 and the conveyor system 20 without any interference between elements of the conveyor system 20 and of the removable device 10 that would block said cooperation.

In one non-represented embodiment, the removable device 10 comprises guiding elements for engaging the removable device 10 in the conveyor system 20. The guiding elements may comprise a sliding element and/or a rail or a longitudinal groove. Those guiding elements advantageously allow easing the cooperation between the removable device 10 and the conveyor system 20.

The removable device 10 may comprise suspension points 15 to to support at least one extremity 231 of a roller 23 of the conveyor system 20. Said suspension points 15 may comprise bearings. Suspension points 15 allow advantageously to reinforce the cooperation between the removable device 10 and the conveyor system 20 when the removable device 10 is engaged over the conveyor system 20. The bearings are advantageously designed to cooperate with a shaft of a roller of the conveyor system.

In one embodiment, at least two rollers 23 of the conveyor system are arranged in such a way than the longitudinal axis of said roller and the rotation axis A-A of the support element 12, 14 merge when the removable device 10 is engaged over the conveyor system 20.

In one embodiment, the removable device 10 comprises the endless ribbon 11. The endless ribbon 11 may be already inked.

One advantage is to be able to install a new ribbon in a conveyor system from which an old ribbon has already been removed.

Frame

Figure 2:
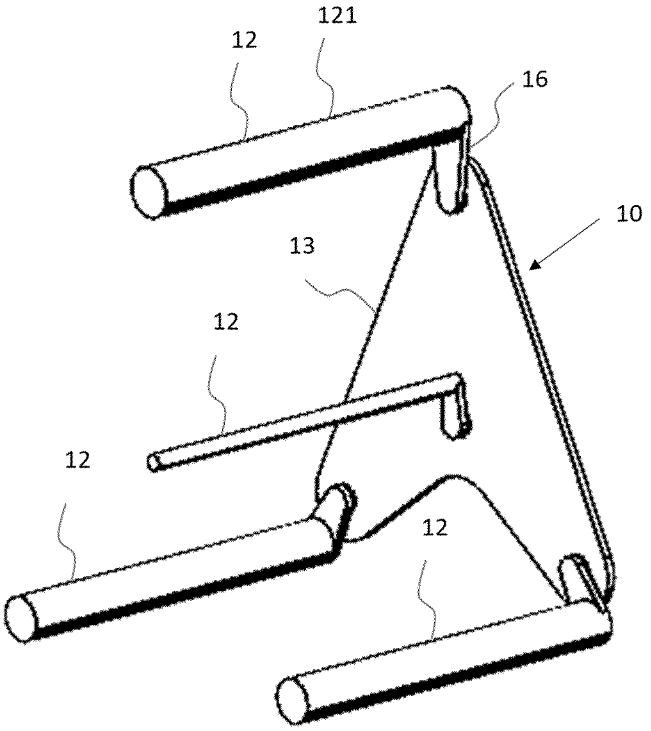
FIG. 2 is a schematic representation of a removable device according to a first embodiment of the invention wherein the removable device comprises a frame and a plurality of support elements comprising rollers connected to the frame.

In one embodiment, illustrated in FIG. 2, each support element 12 of the removable device 10 is connected to a first face of the frame 13. It allows advantageously to let another face of the frame 13 free to install other elements. It also advantageously allows a user to easily manipulate the removable device 10, for example by pushing the removable device 10 on the free face of the frame 13 to install the removable device 10 in the conveyor system 20.

In one embodiment, the free face of the frame 13 comprises one or a plurality of handles. Each handle allows advantageously to ease the insertion of the removable device 10 in the conveyor system 20. It also allows moving the removable device 10 easily.

The frame 13 may comprise a plastic material. The frame may also comprise a molded part, a composite part or a material comprising aluminum. In this configuration, the weight of the removable device 10 is advantageously reduced.

The frame 13 and/or the conveyor system 20 may comprise one or a plurality of sensors. In this embodiment, the frame is electrically connected to the conveyor system 20. The sensors may comprise position sensors. The position sensors allow advantageously to detect movement of the removable device 10 during the ribbon installation to prevent damaging both the conveyor to system 20 and the removable device 10.

In one embodiment, the frame 13 comprises a locking system designed to maintain the removable device 10 engaged over the conveyor system 20. The locking system may comprise an automatic locking system. The locking system may comprise at least one sensor, said sensor being configured to detect cooperation between the frame 13 and the conveyor system 20.

The frame 13 may comprise means of light emission. The means of light emission are designed to light the conveyor system 20. This means of light emission is located to provide enlightenment of the conveyor system during the process of engaging the removable device 10 to advantageously prevent damaging any element of both the removable device 10 and the conveyor system 20.

Support Elements, First and Second Position

The support elements 12,14 comprise a convex portion to support the endless ribbon 11. The convex portion comprises an outer convex face designed to support the endless ribbon 11. The convex portion allows advantageously to reduce local tension in the endless ribbon 11.

In one embodiment, at least one support element 12,14 is connected to the frame 13 of the removable device 10 with a mobile link. The mobile link allows preferably at least one degree of freedom.

In one embodiment, at least one support element 12,14 is movable from a first position to a second position, preferably according to the degree of freedom allowed by the mobile link. The support element may be movable from the first position to the second position by a revolution displacement around the A-A axis. The first position of each support element 12,14 allows maintaining the endless ribbon 11 on their respective convex portion with a first predefined tension. The second position allows reducing the tension in the endless ribbon 11. The transition between the first position and the second position advantageous allows the installation of the ribbon in the conveyor system 20. The first position advantageously allows installing the removable device without damaging the ribbon. The first position also allows stretching the ribbon in such a way that the ribbon is not in contact with rollers in the conveyor system. The second position advantageously allows reducing the tension in the ribbon until the ribbon reaches the ribbon path in the conveyor to system.

The removable device 10 may be removed from the conveyor system 20 after it has been engaged over said conveyor system 20, when each support element 12,14 is in the first position. It advantageously allows replacing an endless ribbon 11 that has reached the end of its lifetime.

Figure 3:
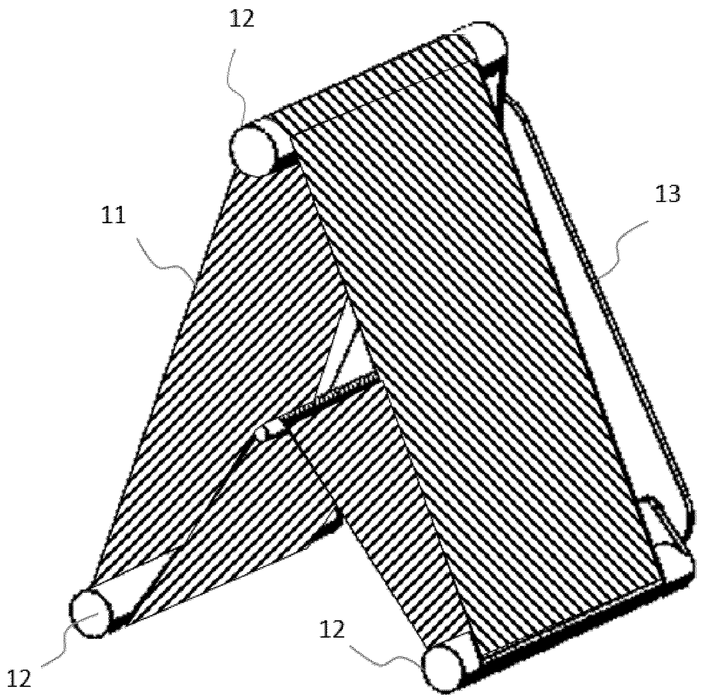
FIG. 3 is a schematic representation of the removable device according to the first embodiment wherein each support element of the removable device is supporting a portion of the endless ribbon.

In one embodiment according to FIG. 3, each support element 12 of the removable device 10 is in the first position when each support element 12 of the removable device 10 is supporting the endless ribbon 11. Advantageously, the first position allows each support element 12,14 of the removable device to support the endless ribbon 11 when a new endless ribbon 11 needs to be installed in the conveyor system 20 or when a used endless ribbon needs to be removed from the conveyor system 20.

Figure 4:
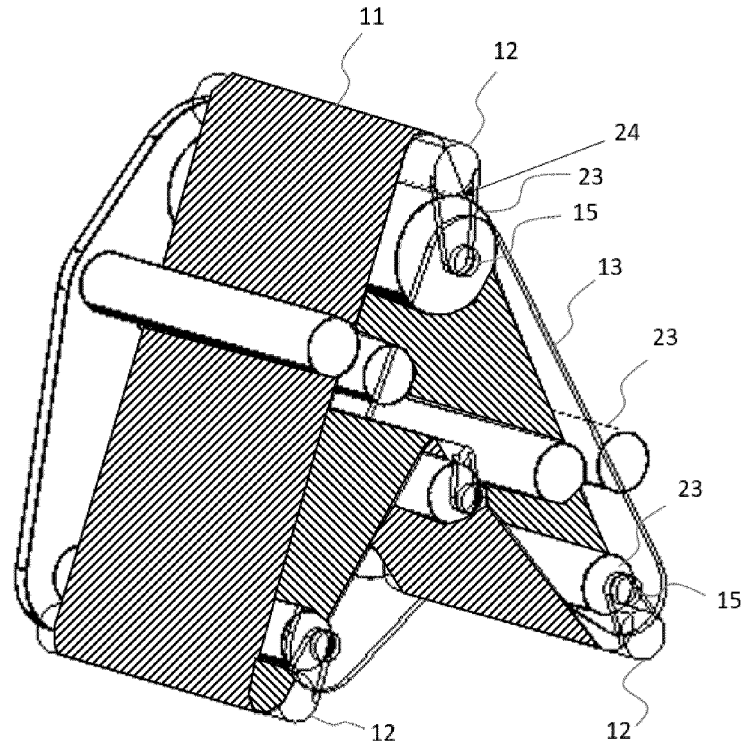
FIG. 4 is a schematic representation of the removable device according to the first embodiment wherein the removable device is engaged over a conveyor system and where each support element of the removable device is in its first position.
Figure 5:
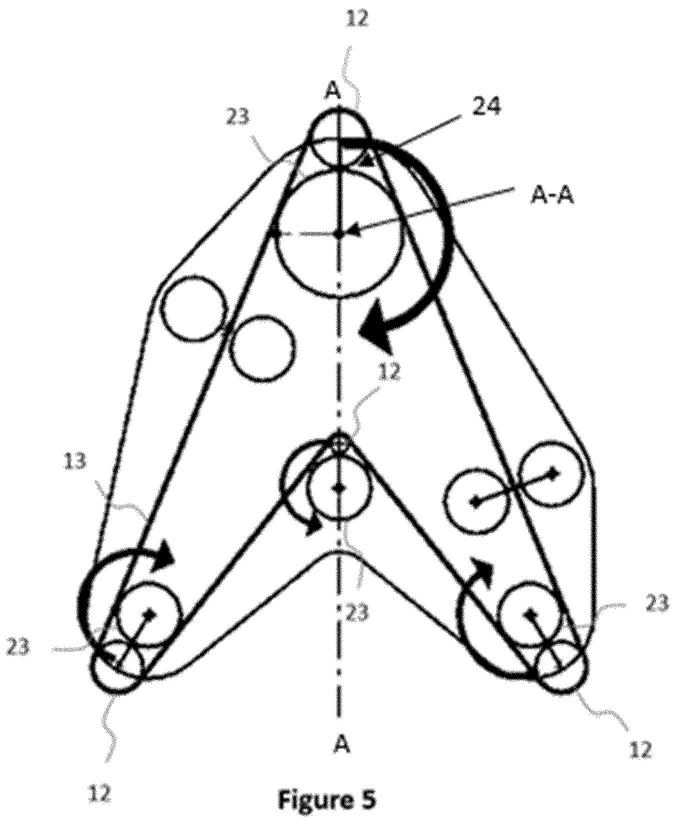
FIGS. 5 to 8 are schematic drawings of the removable device according to the first embodiment wherein each support element is moving from the first to the second position to install the ribbon on the conveyor system.
Figure 6:
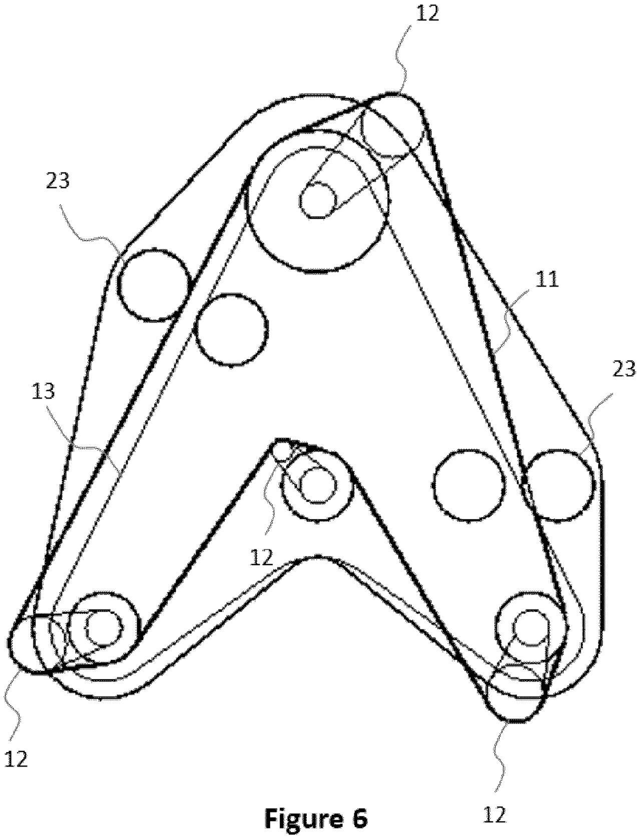
Figure 16:
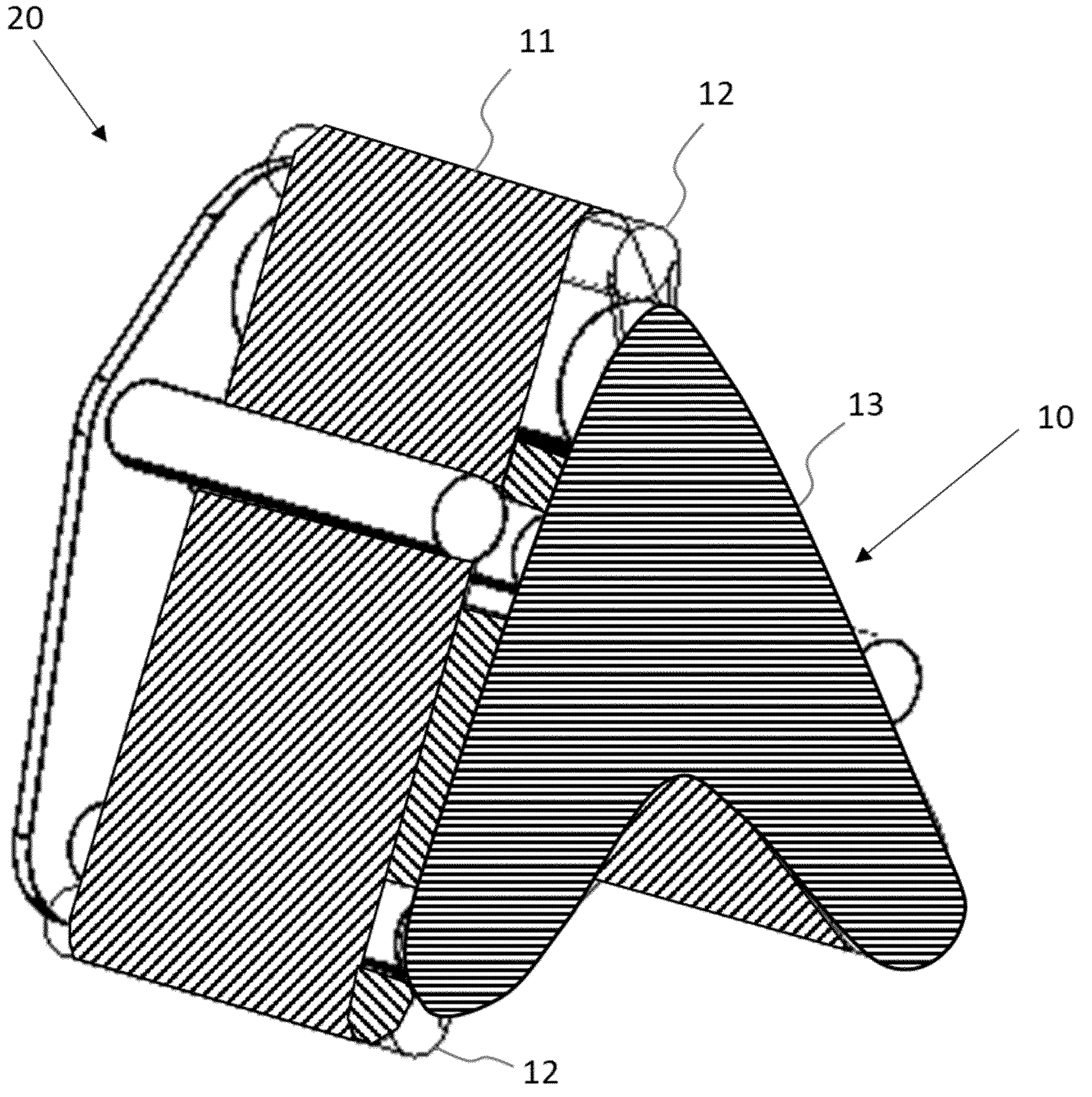
FIG. 16 is a schematic representation of the removable device according to the first embodiment wherein the removable device is engaged over a conveyor system.

In one embodiment according to FIG. 4, FIG. 5 and FIG. 16, each support element 12 of the removable device 10 is in the first position when the removable device 10 is engaged over the conveyor system 20. In this configuration, the endless ribbon 11 is advantageously ready to be installed in the conveyor system.

Figure 15:
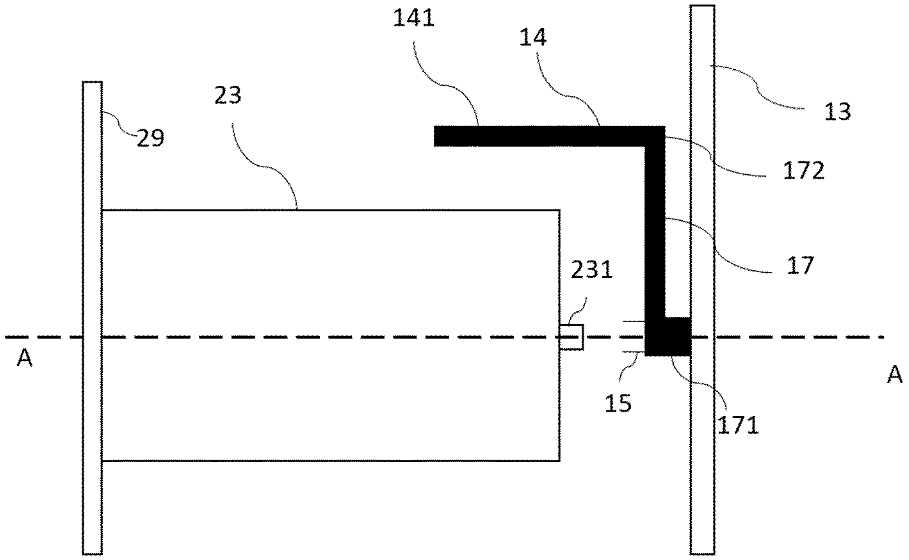
FIG. 15 is a cross-sectional view of a support element of the removable device and a roller of the conveyor system in a plane parallel to the rotation axis of the support element according to one embodiment of the present invention.

As illustrated in FIG. 15, each support element may comprise an arm 16,17 ensuring a mechanical connection between the convex portion and the frame. The connection between the arm and the frame is ensured by a pivot link.

Preferably, the arm 16, 17 is mechanically connected to the frame with a pivot link. In one embodiment illustrated in FIG. 15, the arm 17 comprises a distal end 172 connected to the convex portion 141 and a proximal end 171 connected to the frame 13 of the removable device. The proximal end is connected to the frame with one degree of freedom in rotation around the rotation axis A-A. In one embodiment, the arm extends, between its distal and longitudinal end, in a direction sensibly perpendicular to the rotation axis A-A, preferably along a length superior to the radius of the corresponding roller 23 of the conveyor system. This arm advantageously allows arranging the convex portion in rotation around the roller 23 of the conveyor system 20.

In one embodiment, when the convex portion is a roller, said roller of the support element is connected to the distal end with one degree of freedom in rotation. The roller advantageously preferably reduces friction between the support element 12 and the endless ribbon 11. The roller 121 is mechanically connected to the distal end of the arm 16. The proximal end of said arm 1.

Figure 9:
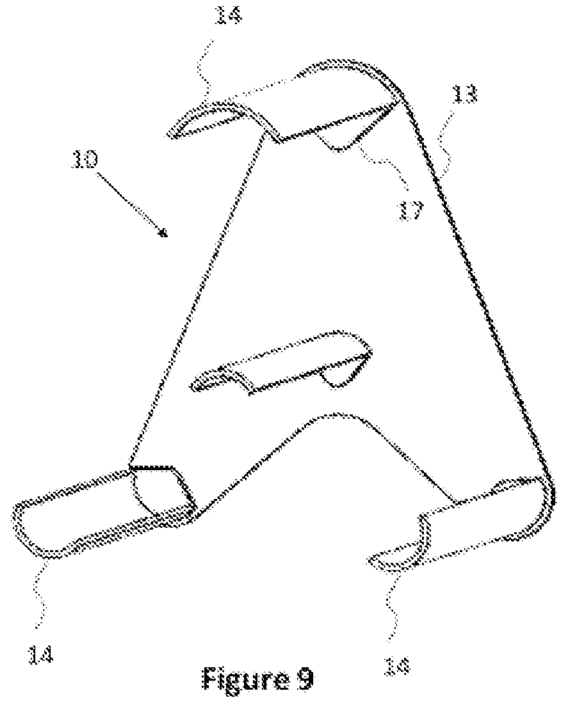
FIG. 9 is a schematic representation of a removable device according to a preferred embodiment wherein the removable device comprises a plurality of support elements having an open section.
Figure 10:
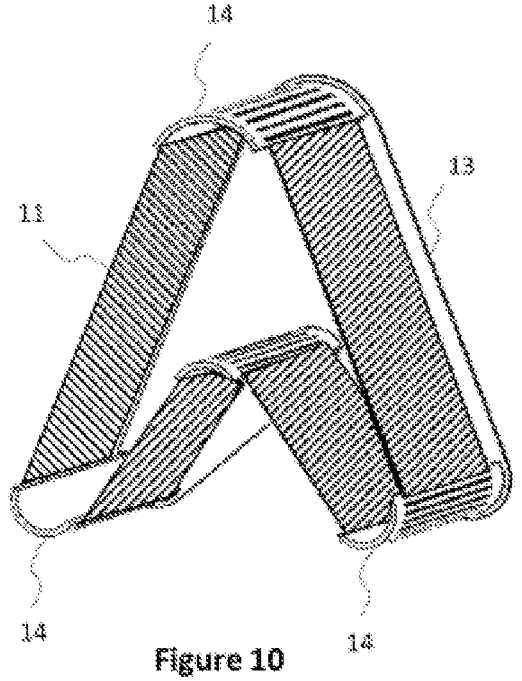
FIG. 10 is a schematic representation of a removable device according to a second embodiment wherein each support element of the removable device is supporting a portion of an endless ribbon.
Figure 11:
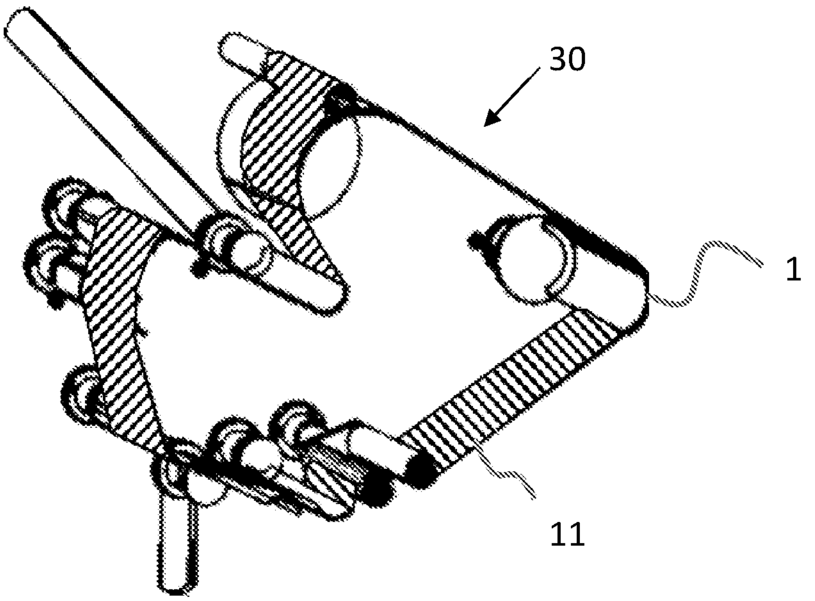
FIG. 11 is a schematic representation of a system comprising a removable device and a conveyor system wherein the removable device is engaged over the conveyor system and the conveyor system comprises a plurality of rollers configured to move along a slide.
Figure 12:
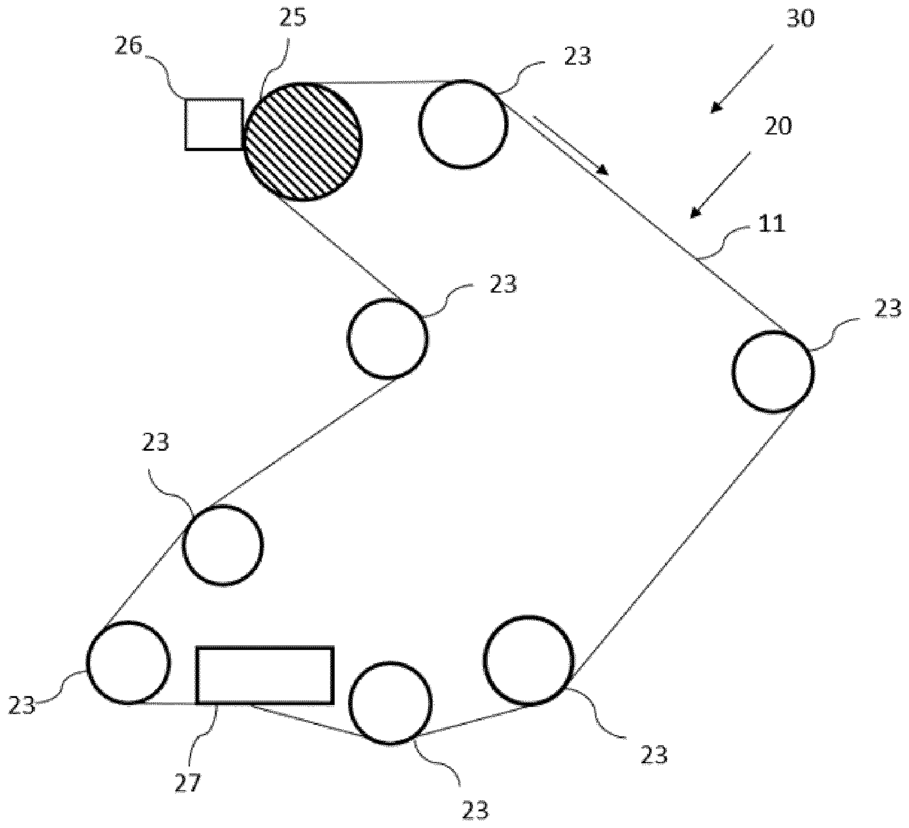
FIG. 12 is a schematic representation of a thermal printing apparatus according to the system of the third embodiment of the invention, wherein the thermal printing apparatus comprises a plurality of rollers, a drive roller, a coater and a printhead.

In one embodiment, illustrated in FIGS. 9 and 10, at least one support element 14 comprises a portion of a hollow cylinder. In this configuration, the thickness of the convex portion is then advantageously reduced. Moreover, the removable device 10 is more compact.

The support elements 14 comprise an inner face designed to face a roller of the conveyor system. Said inner face preferably comprises a concave shape. It advantageously eases the process of engaging the removable device 10 over the conveyor system 20 and reduces the bulk of the removable device 10.

In one embodiment, the inner face of the support elements 14 may have a curvature radius egal or slightly superior to the curvature radius of the surface of a roller 23 facing the inner face in absolute value. This configuration allows reducing the first predefined tension.

In one embodiment, the convex portion may have a length egal or slightly superior to the endless ribbon 11 width. By "length of the convex portion", it should be understood the dimension of the convex portion along sensibly the ribbon width dimension.

In one embodiment, the support element 14 may comprise a stop. The stop advantageously prevents a displacement of the ribbon along the length of the convex portion. The stop may be located on the outer face of the convex portion. The stop may further be located near the distal end of the convex portion. The stop can be defined as a portion of the convex portion that has a superior thickness than the convex portion thickness. This configuration is particularly advantageous to prevent the endless ribbon from falling off the support elements 14.

In one embodiment, the support elements 14 comprises a gripping surface. The gripping surface is intended for supporting the endless ribbon 11. The gripping surface advantageously prevents the endless ribbon 11 to move when the endless ribbon is supported by the support elements of the removable device 10. The gripping surface may comprise a tissue. The gripping surface may have a lower friction in the direction according to the ribbon path than in the direction perpendicular to said ribbon path. It to advantageously prevents the ribbon from slipping of the support element 14.

In one embodiment, at least two support elements 12,14 of the removable device 10 are in the second position when the endless ribbon 11 is supported by at least two rollers 23 of the conveyor system 20.

The removable device 10 may be removed from the conveyor system 20 when each support element 12,14 of the removable device is in the second position. In this configuration, the removable device 10 can advantageously be removed from the conveyor system 20 after the installation of the endless ribbon 11.

The removable device 10 may be inserted in the conveyor system 20 when each support element 12,14 is in the second position. In this configuration, each support element 12,14 of the removable device 10 may be moved in rotation around the axis of rotation A-A. This is particularly advantageous in order to replace the endless ribbon 11 in the conveyor system 20.

In one embodiment, the transition between the first position and the second position of at least one support element 12,14 of the removable device 10 allows to reduce the tension in the endless ribbon 11.

In one embodiment, each support element 12,14 of the removable device 10 is in the second position when each support element 12,14 of the removable device is withdrawn from a predefined ribbon path. A "predefined ribbon path" should be understood as the path defined by the support element 12,14 arrangement when each support element 12,14 is in the first position. A predefined ribbon path could also be any path that would be drawn by another arrangement of elements that would support the endless ribbon 11.

Rotation

In one embodiment, in reference to FIG. 5 and to FIG. 15, at least one support element is free in rotation around a rotation axis A-A.

In one embodiment, at least one support element 12,14 is free in rotation in relation to the frame along at least 90°, preferably 180° around the rotation axis A-A. This rotation defines a circular trajectory around the rotation axis A-A. In reference to FIGS. 5 to 8, the rotation of at least one support element 12,14 of the removable device 10 around the rotation axis A-A allows advantageously to drop off the endless ribbon 11 on each roller 23 of the conveyor system 20.

In one embodiment, at least one pivot link connecting at least one arm 16,17 to the frame 13 allows a rotation of at least 90°, preferably 180° of said at least one arm 16,17 around the rotation axis A-A.

One advantage is to shift the ribbon from a position wherein it is supported by the support elements to a position wherein it is supported by the rollers of the conveyor system.

Figure 13:
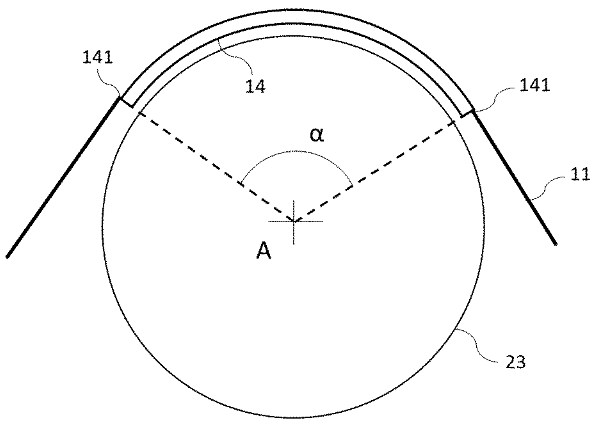
FIG. 13 is a cross-sectional view of a support element of the removable device partially covering the roller of the conveyor system in a plane perpendicular to the rotation axis of the support element according to one embodiment of the present invention.
Figure 14:
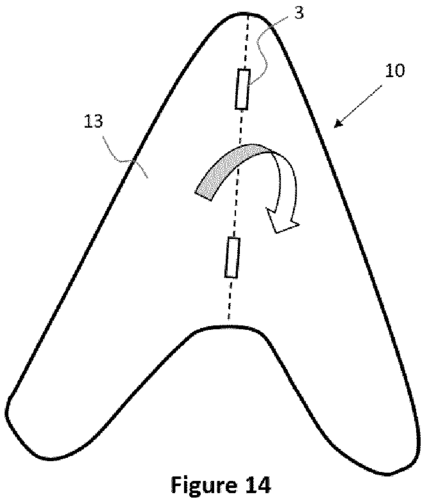
FIG. 14 is a schematic representation of a foldable removable device according to one embodiment of the present invention.

In one embodiment illustrated in FIG. 13, the angular distance a between two ends 141 of the section of the convex portion in a plane perpendicular to the axis of rotation A-A is less than 270°, preferably less than 180° or 120°. The angular distance a is measured in the section from the point of the axis A-A in said section according to a plane perpendicular to the rotation axis A-A.

One advantage is to ensure that the rotation of the support element 12, 14 will allow shifting the endless ribbon 11 to a roller 23 of the conveyor system 20.

Another advantage is to ensure a maximal size of the support element of the removable device.

In one embodiment, the rotation axis A-A of one support element 12,14 of the removable device 10 is parallel or sensibly parallel to the rotation axis of one roller 23 of the conveyor system 20. It allows advantageously the rotation of each support element 12,14 around each roller 23 with no contacts when the removable device 10 is engaged over the conveyor system 20.

Figure 7:
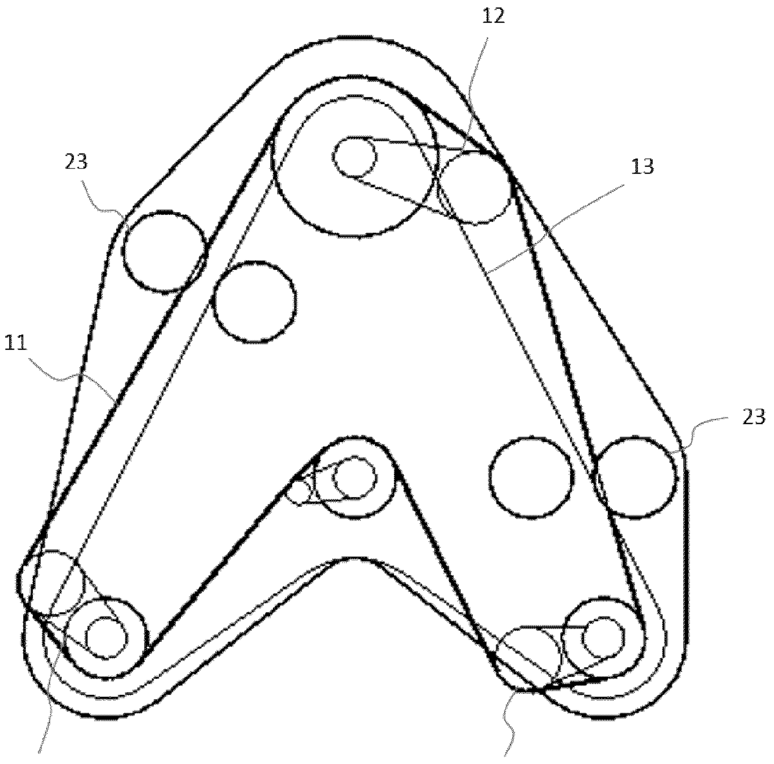

In one embodiment, according to FIG. 7, each support element 12,14 of the removable device 10 is in an intermediate position between the first and the second position. In this configuration, the tension in the endless ribbon 11 is advantageously maintained.

Figure 8:
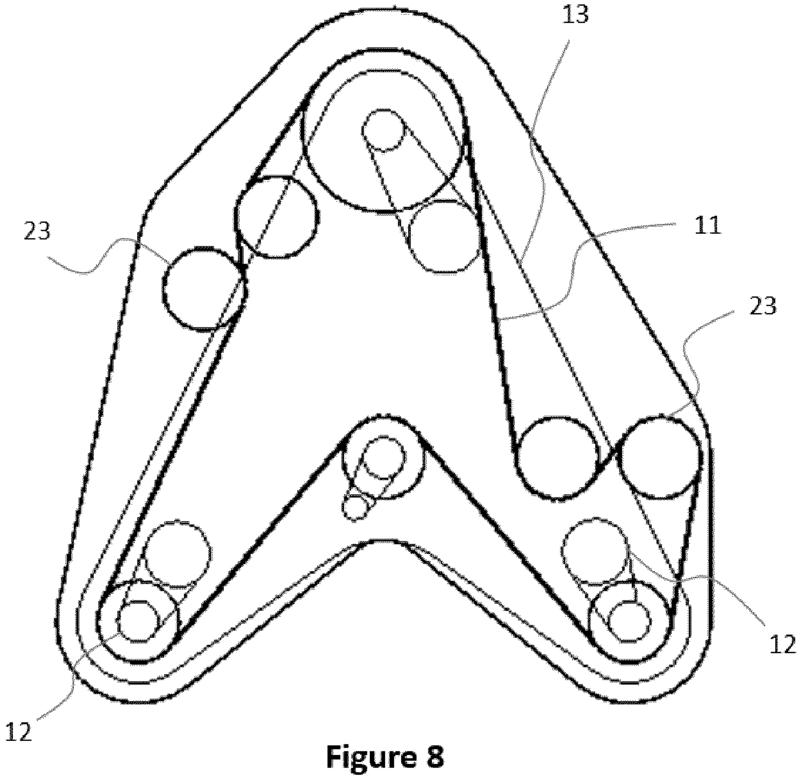

In one embodiment according to FIG. 8, each support element 12,14 of the removable device 10 is in the second position after a rotation of 180° around the rotation axis. In this configuration, the tension in the endless ribbon 11 has been advantageously reduced and the endless ribbon 11 is now supported by at least two rollers 23 of the conveyor system.

The revolution trajectory of each support element 12,14 allows advantageously to drop off the endless ribbon 11 on each roller 23 of the conveyor system 20.

In one embodiment, each support element 12,14 of the removable device 10 is still in contact with the endless ribbon 11 while each support element 12,14 of the removable device 10 moves in rotation around one roller 23 of the conveyor system 20. In this configuration, the tension in the endless ribbon 11 is advantageously maintained during the transition between the first and the second position.

In one embodiment at least one support element 12,14 is designed to move in rotation around the axis A-A independently of one another. In this configuration, it allows advantageously to drop off the endless ribbon 11 little by little on each roller 23 of the conveyor system 20.

In another embodiment, the removable device 10 is designed in such a way that the movement of at least one support element 12,14 according to the mobile link drives a similar movement of another support element 12, 14 of the removable device 10.

In this configuration, the endless ribbon 11 may advantageously be dropped off on each roller 23 of the conveyor system 20 in once.

Second Degree of Freedom

In one embodiment, at least one support element 12,14 is free in translation along a second degree of freedom in relation to the frame 13. In this purpose, the frame may comprise a slide. The translation of one of the support elements 12,14 advantageously allows changing the tension in the endless ribbon 11. The installation of the endless ribbon 11 is advantageously eased. Moreover, in this configuration, the risk of damaging the endless ribbon 11 during the installation is advantageously reduced.

Preferably, the slide allows the translation of the support element 12,14 between two positions: an outer position and an inner position wherein the tension of the ribbon is lower than in the outer position. The removable device 10 may further comprise a loaded spring to automatically bring the support element back to the inner position.

Interface

In one embodiment, the removable device 10 may comprise an interface. In one example, the interface comprises controls means.

The control means are configured to control the movement of at least one support element between the first and the second position. The control means are mechanically connected to at least one support element 12,14. The control means may comprise a motor driven by the interface and to driving the movement of the support elements 12, 14.

The interface may comprise an actuator. The actuator is configured to activate the control means to control the movement of the support element from the first to the second position or from the second to the first position.

In this configuration, the control means advantageously allow a user to control the movement of at least one support element 12,14 of the removable device 10.

One advantage of the invention is that the endless ribbon 11 stays under tension during the steps of installing the ribbon in the conveyor system and removing the ribbon from the conveyor system 20. For this purpose, the support elements 12, 14 are arranged on the frame in such a way that they draw a path sensibly equal to the length of the endless ribbon 11. For the same purpose, the rollers 23 are arranged in the conveyor system 20 in such a way that they draw a path sensibly equal to the length of the endless ribbon 11.

In another embodiment, the interface comprises electronic means to drive the control means.

The actuator may mechanically control the control means to actuate the movement of the support element. The actuator may comprise a handle to control the support element. The actuator may also comprise electronic means such as a button.

In another embodiment, the controls may comprise a motor to drive the support element.

The interface may be designed to control the movement of two support elements 12,14 independently of one another.

Sequence

The interface or the control means may also be designed to move two support elements in a synchronized manner. The interface may also be designed to move two support elements to the first or second position according to a predefined sequence.

For example, the predefined sequence may include:

- the actuation of the movement of a first support element to the first or second position;
- the automatic actuation of the movement of a second support element to respectively the first or second position when:
  - the first support element has reached respectively the first or second position, or the first support element has reached a predefined intermediate position between the first and the second position.

The interface may comprise an actuator which can be actuated by a user to initiate the predefined sequence.

This configuration is particularly advantageous if the user wants to drop off the endless ribbon 11 little by little in the conveyor system. It may advantageously optimize the installation of the ribbon to prevent damages on the ribbon.

In another embodiment, the predefined sequence may be the motion of each support element 12,14 to the first or second position in the same rotation direction and at the same time.

In one embodiment, the removable device comprises at least one sensor to monitor the movement of the support elements and preferably detect a deviation between the predefined sequence and the movement monitored of the support elements.

In one embodiment, the interface may comprise means to reverse or to stop an initiated sequence. This is particularly advantageous in the case where the user wants to prevent damaging both the removable device 10 and the conveyor system 20 when the installation goes wrong.

In one embodiment, the removable device 10 and/or the conveyor system 20 comprise recording means. The recording means may be designed to film the installation or the removal of the endless ribbon 11 in the conveyor system 20. The recording means may be connected to a screen. This configuration is particularly advantageous if the user wants to follow the installation or the removal of the endless ribbon 11 in real time.

Conveyor System and Removable Device

According to a second aspect, the invention further relates to a system comprising a removable device 10 and a conveyor system 20. The conveyor system 20 is adapted to cooperate with the removable device 10. Preferably, the removable device is the same as according to the invention. A system according to this aspect of the invention is illustrated in reference to FIG. 4.

In one embodiment, the first circumferential portion 24 of each roller 23 may be in contact with one support element 12,14 of the removable device when each support element 12,14 of the removable device is in the first position. This configuration allows advantageously to reinforce the stability of the removable device 10 and the conveyor system 20. Another advantage is to make sure that the endless ribbon 11 will be dropped off without being damaged on each roller 23 of the conveyor system 20 after the transition between the first and the second position of each support element 12,14 of the removable device 10.

In one embodiment, the cooperation between the removable device 10 and the conveyor system 20 may be maintained by securing means. In this configuration, the securing means may be a locking system. It should be understood by "cooperation" the fact that the removable device 10 is engaged over the conveyor system 20. This configuration is particularly advantageous to ensure that the frame 13 of the removable device 10 will be fixed during the installation of the ribbon in the conveyor system 20. Another advantage of this configuration is to possibly ensure that the frame 13 of the removable device 10 will be fixed to the conveyor system 20 during a step of printing.

In one embodiment, the system may comprise an alarm. The alarm may be actuated by the position sensors.

The system may comprise an endless ribbon. In one non-represented embodiment, the endless ribbon comprises a protecting sheet on its outer surface. The protective sheet may comprise a tongue. The tongue may be unrolled to separate the endless ribbon from the protective sheet. This configuration allows advantageously an easy installation of the endless ribbon 11 in the conveyor system 20.

Thermal Printing Apparatus and System

According to another aspect, the invention further relates to a thermal printing apparatus 30 comprising a system according to the invention. Preferably, the system is the same system as the system according to the second aspect of the invention.

In one embodiment, the thermal transfer printing apparatus comprises a printhead 27. The printhead allows advantageously to transfer ink from the ribbon to a substrate, using thermal transfer. The thermal transfer printing apparatus further comprises a coater to continuously coat the outer to face of the ribbon with new ink. The coater 26 a slot-die coating device, an ink roller or any coating device known by the skilled person to coat a ribbon.

In one embodiment, the thermal printing apparatus 30 comprises a coater 26. The coater allows advantageously to coat the ribbon when the ink has been used to print.

Foldable Removable Device

In one embodiment, the removable device is foldable. In one embodiment the frame of the removable device is in several portions connected by a pivot connection, for example by a hinge 3. One advantage is to facilitate the transport and storage of such removable device. In one embodiment, the removable device is packaged with an endless ribbon already arranged around the support elements 12, 14.

The invention claimed is:

1. A removable device to insert an endless ribbon within a conveyor system of a thermal transfer printing apparatus comprising:

a frame;

at least two support elements to support an endless ribbon and each support element being movable in rotation around a rotation axis, each support element comprising a convex portion to support a portion of the endless ribbon, and an arm having a distal end mechanically connected to the convex portion and a proximal end mechanically connected to the frame by a pivot connection allowing the rotation of the support element around the rotation axis.

2. The removable device according to claim 1, wherein each support element is free to rotate at least 90° around the rotation axis.

3. The removable device according to claim 1 wherein one of the at least two support elements is connected to the frame with at least one degree of freedom in translation.

4. The removable device according to claim 1, wherein each support element is movable around the rotation axis between at least first and second positions, the first position of each support element allowing maintaining the endless ribbon on their respective convex portion with a first predefined tension, the second position allowing reducing the first predefined tension.

5. The removable device according to claim 1, wherein the convex portion of at least one of the at least two support elements comprises a portion of a hollow cylinder.

6. The removable device according to claim 1, wherein the convex portion of at least one of the at least two of one support elements comprises a cylinder free in rotation with the distal end of the arm along the longitudinal axis of said cylinder.

7. The removable device according to claim 2, wherein each support element is free to rotate at least 180° around the rotation axis.

8. A thermal transfer printing apparatus comprising a removable device according to claim 1 and a conveyor system comprising at least two rollers to support the endless ribbon on a first circumferential portion of each roller, wherein the conveyor system is adapted to cooperate with the removable device.

9. The thermal transfer printing apparatus according to claim 8, wherein the removable device comprises the endless ribbon, said endless ribbon being supported by at least two support elements of the removable device.

10. The thermal transfer printing apparatus according to claim 8, wherein the removable device comprises cooperation elements for engaging each support element into the conveyor system.

11. The thermal transfer printing apparatus according to claim 8, wherein each support element is movable around the rotation axis between at least two first and second positions, the first position of each support element allowing maintaining the endless ribbon on their respective convex portion with a first predefined tension, the second position allowing reducing the first predefined tension[II] and wherein the removable device is adapted to be removed from the conveyor system when each support element is in the first or the second position.

12. The thermal transfer printing apparatus according to claim 11, wherein each support element is in its second position when each support element is withdrawn from a predefined ribbon path.

13. The thermal transfer printing apparatus according to claim 12, wherein each support element is in its second position when each support element is withdrawn from a predefined ribbon path, the predefined ribbon path being associated with a ribbon path when each support element is in the first position.

14. The thermal transfer printing apparatus according to claim 11, wherein said removable device is designed to be engaged along at least two rollers of the conveyor system, each support element being movable between the first and the second position around one roller of the conveyor system when the removable device is engaged over the conveyor system:

- in the first position, each support element is arranged to cover the first circumferential portion of one roller of the conveyor system;
- in the second position, each support element allows free passage of the endless ribbon along the first circumferential portion.

15. The thermal transfer printing apparatus according to claim 14, wherein the rotation axis of one support element of the removable device is parallel to the rotation axis of one roller of the conveyor system.

16. A system comprising a removable device according to claim 1, wherein the removable device comprises at least two parts jointed on at least one pivot and further comprising an endless ribbon installed around the at least two support elements of the removable device.

17. The system according to claim 16, wherein the endless ribbon is inked.

* * * * *